(12) United States Patent
White et al.

(10) Patent No.: US 12,271,009 B2
(45) Date of Patent: Apr. 8, 2025

(54) RETRO-REFLECTIVE MARKER WITH UNIFORMLY DISTRIBUTED MICROELEMENTS

(71) Applicant: Northern Digital Inc., Waterloo (CA)

(72) Inventors: Shaulaine White, Troy (CA); Derek Peter Zwambag, Guelph (CA); Larry Chen, Fergus (CA); Athanasios Tommy Balkos, Waterloo (CA)

(73) Assignee: Northern Digital Inc., Waterloo (CA)

( * ) Notice: Subject to any disclaimer, the term of this patent is extended or adjusted under 35 U.S.C. 154(b) by 0 days.

(21) Appl. No.: 18/674,190

(22) Filed: May 24, 2024

(65) Prior Publication Data

US 2025/0012953 A1   Jan. 9, 2025

Related U.S. Application Data

(60) Provisional application No. 63/525,382, filed on Jul. 7, 2023.

(51) Int. Cl.
*G02B 5/124* (2006.01)

(52) U.S. Cl.
CPC .................... *G02B 5/124* (2013.01)

(58) Field of Classification Search
None
See application file for complete search history.

(56) References Cited

U.S. PATENT DOCUMENTS

| | | | | |
|---|---|---|---|---|
| 3,833,285 A | * | 9/1974 | Heenan | G02B 5/124 359/551 |
| 4,152,046 A | * | 5/1979 | Knapp | G02B 5/124 359/532 |
| 4,440,104 A | * | 4/1984 | Bleiweiss | B60Q 7/005 116/63 T |
| 4,957,335 A | | 9/1990 | Kuney | |
| 5,189,553 A | * | 2/1993 | Smith | G02B 5/124 359/530 |
| 6,015,214 A | * | 1/2000 | Heenan | B29C 33/42 359/530 |
| 6,206,525 B1 | | 3/2001 | Rowland et al. | |
| 8,412,308 B2 | | 4/2013 | Goldbach | |
| 8,662,683 B2 | | 3/2014 | Rossner | |

(Continued)

FOREIGN PATENT DOCUMENTS

WO   WO 2021/211650   10/2021

OTHER PUBLICATIONS

Northern Digital Inc. [online], "How Passive Marker Spheres Work—Northern Digital Inc. (NDI)," Nov. 10, 2021, retrieved on Jun. 10, 2024, URL<https://www.youtube.com/watch?v=pSSfMfDov-s>, 12 pages [Video Submission].

*Primary Examiner* — Derek S. Chapel
(74) *Attorney, Agent, or Firm* — Fish & Richardson P.C.

(57) ABSTRACT

An apparatus including a retro-reflective section. The retro-reflective section includes an outer surface, an inner surface, and a plurality of retro-reflective microelement. One or more of the plurality of retro-reflective microelements include a plurality of reflective surfaces. Each of the plurality of retro-reflective microelements extends from the inner surface at a location different from locations of the other retro-reflective microelements, and each of the plurality of retro-reflective microelements comprises a central axis extending along a direction that corresponds to a surface normal of the outer surface.

30 Claims, 10 Drawing Sheets

(56) References Cited

U.S. PATENT DOCUMENTS

| | | | |
|---|---|---|---|
| 8,668,340 B2 | 3/2014 | Jordanov et al. | |
| 9,964,649 B2 | 5/2018 | Shafer et al. | |
| 10,162,218 B2 | 12/2018 | Nevitt et al. | |
| 10,537,393 B2 | 1/2020 | Huldin et al. | |
| 10,939,977 B2 | 3/2021 | Messinger et al. | |
| 2008/0183065 A1 | 7/2008 | Goldbach | |
| 2015/0282736 A1 | 10/2015 | Huldin et al. | |
| 2015/0309187 A1 | 10/2015 | Shafer et al. | |
| 2016/0370653 A1 | 12/2016 | Nevitt et al. | |
| 2017/0020622 A1 | 1/2017 | Huldin et al. | |
| 2019/0064646 A1* | 2/2019 | Chapman | G02B 5/124 |
| 2020/0163739 A1 | 5/2020 | Messinger et al. | |
| 2021/0311381 A1 | 10/2021 | Wang et al. | |
| 2022/0096168 A1 | 3/2022 | White et al. | |
| 2022/0413196 A1 | 12/2022 | Chen et al. | |

* cited by examiner

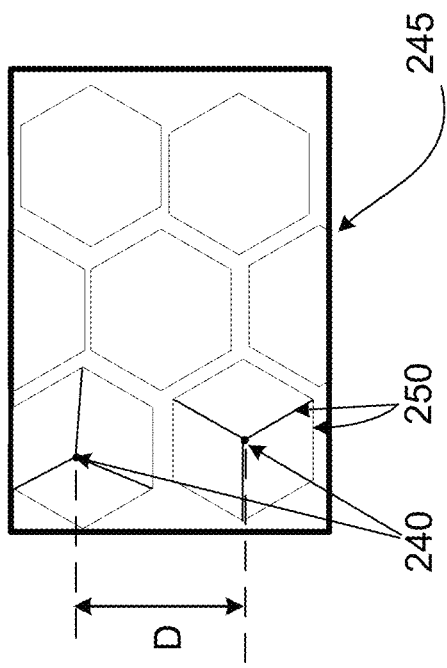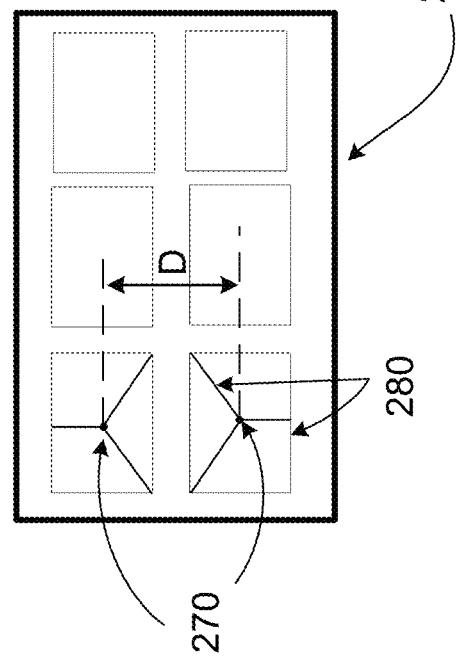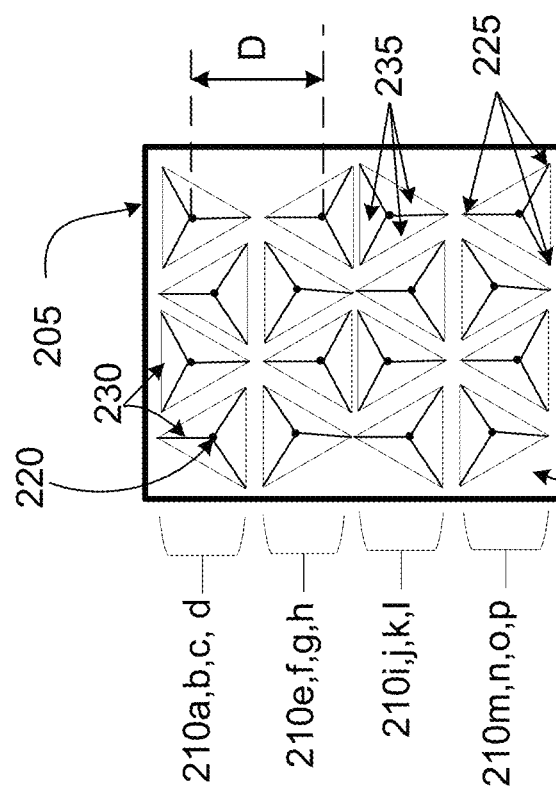

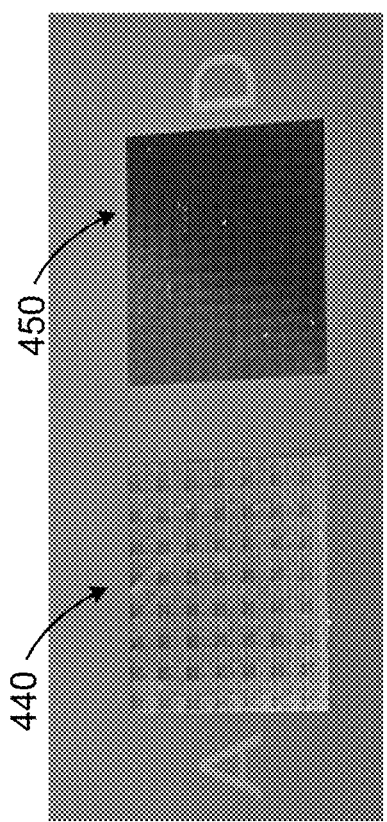
FIG. 4B
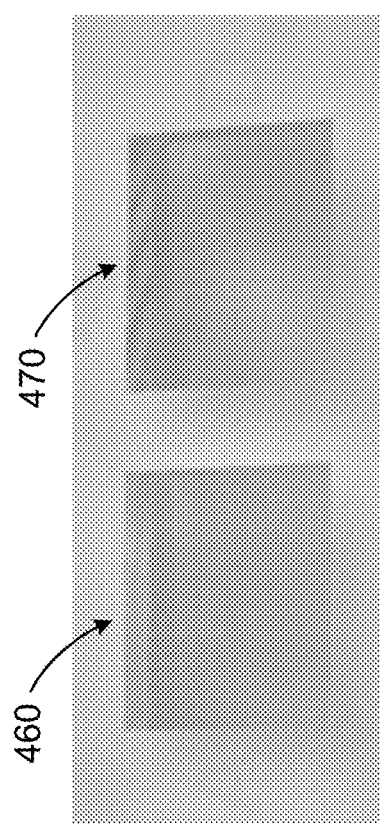
FIG. 4C
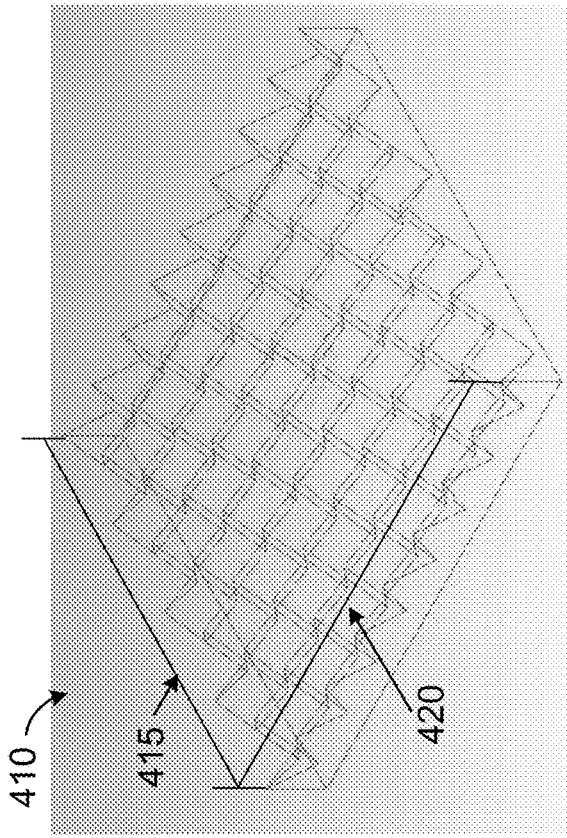
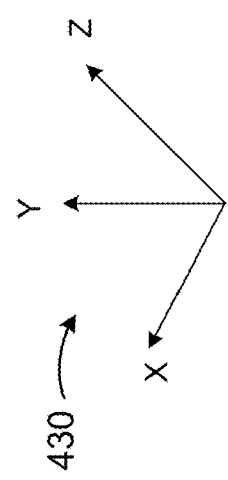
FIG. 4A

RETRO-REFLECTIVE MARKER WITH UNIFORMLY DISTRIBUTED MICROELEMENTS

CLAIM OF PRIORITY

This application claims priority under 35 USC § 119 (e) to U.S. Patent Application Ser. No. 63/525,382, filed on Jul. 7, 2023, the entire contents of which are hereby incorporated by reference.

TECHNICAL FIELD

This disclosure relates to retro-reflective markers, particularly retro-reflective markers with uniformly-distributed retro-reflective microelements.

BACKGROUND

Tracking systems (e.g., optical tracking systems) can rely on objects with one or more markers affixed hereto.

An optical tracking system typically includes multiple retro-reflective markers located at different positions with respective orientations to achieve retro-reflectivity. Retro-reflective markers usually include multiple microelements that are substantially smaller in characteristic size than the retro-reflective markers or the tools or devices where the markers are positioned. These microelements are generally retro-reflective such that incoming optical signals traveling along an incoming path can be reflected along a path that is substantially opposite to the incoming path.

Optical tracking systems with retro-reflective markers can have various applications. For example, optical tracking systems can capture motions or movements of one or more objects, which can be used for animation, sports analysis, medical research, surgical operations, etc. Optical tracking systems can also be implemented in Augmented Reality (AR) and Virtual Reality (VR), biomechanics, robotics, and computer vision.

SUMMARY

Described herein is an apparatus used as a retro-reflective marker or at least a portion of a retro-reflective marker for a tracking system that is configured to determine a position of a tracked object in an environment by estimating the pose(s) (e.g., positions and orientations) of one or more markers affixed to the tracked object. Manufacturing techniques that produce three-dimensional (3D) markers (e.g., having a curved surface) from two-dimensional (2D) retro-reflective markers (e.g., 2D sheets containing many markers) can result in 3D markers having uneven distributions of small reflective elements (e.g., microelements) and in some instances deform the microelements. Accordingly, the brightness of retro-reflected optical signals generated by these markers having a curved surface becomes less consistent for incoming optical signals at different incident angles, thereby reducing the tracking accuracy of the tracking system.

In stark contrast, the apparatus described herein can be manufactured as a single structure, e.g., by injection molding or other suitable techniques, that provides a desired distribution (e.g., an even distribution) of retro-reflective microelements. The desired distribution can be pre-determined according to different retro-reflective tasks and achieved by one or more manufacturing techniques (e.g., injection molding), etc. Along with providing a desired distribution, unwanted changes in the desired distribution are reduced, unwanted deformation is reduced, etc.

More specifically, the apparatus described herein has a retro-reflection section for reflecting incoming optical signals in directions substantively parallel to their respective incoming directions (or at respective incident angles). The retro-reflective section can include one or more coupling mechanisms for coupling the retro-reflective section with one or more other retro-reflective sections of corresponding apparatuses to form an assembly. The apparatus or an assembly of one or more apparatuses can be used as a retro-reflective marker for a tracking system. The retro-reflective section includes an outer surface and a corresponding inner surface. The outer surface is generally curved and smooth and defines a surface normal with varying directions. The inner surface can have a corresponding topology (and optional a corresponding surface normal) as the outer surface.

The retro-reflective section further includes multiple retro-reflective microelements that are generally small relative to the size of the retro-reflective section or the marker. For example, a retro-reflective microelement can have a characteristic length of one or more millimeters, less than one millimeter, etc. The retro-reflective microelements can have one or more shapes, such as microbeads or microspheres, micro-corner cubes, microprisms, etc. Each retro-reflective microelement extends from the inner surface at a different location from the other retro-reflective microelements. Each retro-reflective microelement includes a central axis extending along a direction corresponding to the surface normal of the outer surface. The alignment between the central axis and the surface normal improves the consistency of retro-reflective brightness. Since the surface normal has respective directions at different locations and the central axes of different retro-reflective microelements substantially align with the surface normal, the central axes at different locations extend into respective directions corresponding to the surface normal. In some cases, the central axes might extend in directions deviating from the direction of the surface normal by a pre-determined offset angle.

The retro-reflective section can further include a reflective coating deposited on the surfaces of the multiple retro-reflective microelements to enhance the retro-reflective effect. For example, having a reflective coating can provide a wider viewing angle for retro-reflectivity, at a slightly reduced brightness. Whether to have a reflective coating deposited on the retro-reflective section depends on the requirements of retro-reflectivity. For example, for applications where a wider retro-reflectivity is not needed, the retro-reflective section can provide retro-reflection without having a reflective coating. The reflective coating can include one or more materials, such as silver, aluminum, or any other similar reflective material. In addition, one or more of the multiple retro-reflective microelements can have multiple reflective surfaces to reflect or retro-reflect incoming visual signals. For example, a first retro-reflective microelement can have two reflective surfaces to reflect or retro-reflect incoming lights.

In a general aspect, this document describes an apparatus including a retro-reflective section. The retro-reflective section includes an outer surface, an inner surface, and a plurality of retro-reflective microelements. Each of the plurality of retro-reflective microelements extends from the inner surface at a location different from locations of the other retro-reflective microelements. Each of the plurality of retro-reflective microelements comprises a central axis extending along a direction that corresponds to a surface normal of the outer surface. The apparatus further includes a reflective coating deposited on surfaces of the plurality of retro-reflective microelements.

Implementations can include one or more of the following features.

One of the plurality of retro-reflective microelements can be a microprism. The retro-reflective section can further include a coupling mechanism to couple the retro-reflective section with one or more other retro-reflective sections.

In some implementations, the retro-reflective section can form at least a portion of a retro-reflective marker with a hollow spherical shape, a hollow conical shape, or a hollow cylindrical shape. In some cases, the retro-reflective section can form one or more retro-reflective markers.

The geometry and the arrangement of the plurality of retro-reflective microelements can be pre-determined for manufacturing the retro-reflective section. In some implementations, the retro-reflective section can be manufactured by injection molding.

Each edge of one of the plurality of retro-reflective microelements can have a length of less than 1 mm. Each of the plurality of retro-reflective microelements can define a microprism center, and two adjacent retro-reflective microelements of the plurality of retro-reflective microelements can be spaced apart between respective microprism centers at a distance of less than 1 mm.

In some implementations, the central axis can extend in a direction that is parallel to the surface normal of the outer surface by an offset. The offset can be determined by applying a randomization algorithm to the plurality of retro-reflective microelements.

In some implementations, the retro-reflective section can include a polymer that is transmissive in the Near Infrared (NIR) spectrum band. The reflective coating can be deposited on the surfaces of the plurality of retro-reflective microelements through vapor deposition. The reflective coating can include a metal material.

Additionally, the retro-reflective section can form a portion of a body of a tool for optical tracking. Alternatively, the retro-reflective section can form a portion of a marker configured to be mounted to a tool for optical tracking. In some cases, the retro-reflective section can include a first retro-reflective section and a second retro-reflective section. The first retro-reflective section can form a portion of a body of a tool for optical tracking, and the second retro-reflective section can form a portion of a marker configured to be mounted to the tool.

As another aspect, a marker includes a first portion, which includes one or more retro-reflective sections coupled to one another. One of the one or more retro-reflective sections includes an outer surface, an inner surface, and a plurality of retro-reflective microelements. Each of the plurality of retro-reflective microelements extends from the inner surface at a location different from locations of the other retro-reflective microelements, and each of the plurality of retro-reflective microelements comprises a central axis extending along a direction that corresponds to a surface normal of the outer surface. The one retro-reflective section further includes a reflective coating deposited on surfaces of the plurality of retro-reflective microelements.

The marker further includes a second portion comprising a connecting mechanism configured to connect the first portion to a device.

As another aspect, an apparatus includes a device for optical tracking and a retro-reflective marker. The retro-reflective marker is attached to the device through a connecting mechanism of the retro-reflective marker. The retro-reflective marker comprises one or more retro-reflective sections coupled to one another. One of the one or more retro-reflective sections includes an outer surface, an inner surface, and a plurality of retro-reflective microelements. Each of the plurality of retro-reflective microelements extends from the inner surface at a location different from locations of the other retro-reflective microelements, and each of the plurality of retro-reflective microelements comprises a central axis extending along a direction that corresponds to a surface normal of the outer surface. The one retro-reflective section further includes a reflective coating deposited on surfaces of the plurality of retro-reflective microelements.

The implementations described herein can provide various technical benefits. For example, the described apparatus and markers (including an assembly of multiple apparatuses) can improve the uniformness of retro-reflected optical signals along different angles, further improving the tracking accuracy of a tracking system using the described apparatus and markers. Since the described apparatus is manufactured using techniques such as injection molding controlled by pre-determined geometries and parameters, the distribution and the shape of retro-reflective microelements are substantially the same as controlled for the injection molding process. Thus, the brightness of reflected optical signals generated by the described apparatus and corresponding markers are substantially uniform and controllable.

In addition, the described techniques for manufacturing a marker are robust and efficient for different tracking tasks. Since the described apparatus is manufactured using injection molding and includes one or more coupling mechanisms configured to couple itself with one or more other apparatus, the geometries (e.g., size, shape, or both) of the described apparatus, the geometries of the assembled marker using one or more described apparatuses, and the arrangement (e.g., size, shape, distribution, etc.) of retroreflective microelements on the described apparatus or marker can be pre-determined or adjusted or both according to different requirements for different tracking tasks. Moreover, the utilization of injection molding the retro-reflective sections and the ability to design diverse assemblies of multiple retro-reflective sections can reduce the time and cost of researching and developing new configurations of retro-reflective markers.

The details of one or more embodiments are set forth in the accompanying drawings and the description below. Other features and advantages will be apparent from the description and drawings, and from the claims.

BRIEF DESCRIPTION OF THE DRAWINGS

FIGS. 2A, 2B, and 2C are bottom views of example retro-reflective sections.

FIG. 4A is a perspective view of a retro-reflective building block formed on a flat surface and having a rectangular geometry with varying cube angles.

FIG. 4B shows an example retro-reflective building block formed on a flat surface with varying cube angles.

FIG. 4C shows another example retro-reflective building block positioned on a flat surface with varying cube angles.

Like reference numbers and designations in the various drawings indicate like elements.

DETAILED DESCRIPTION

Figure 1:
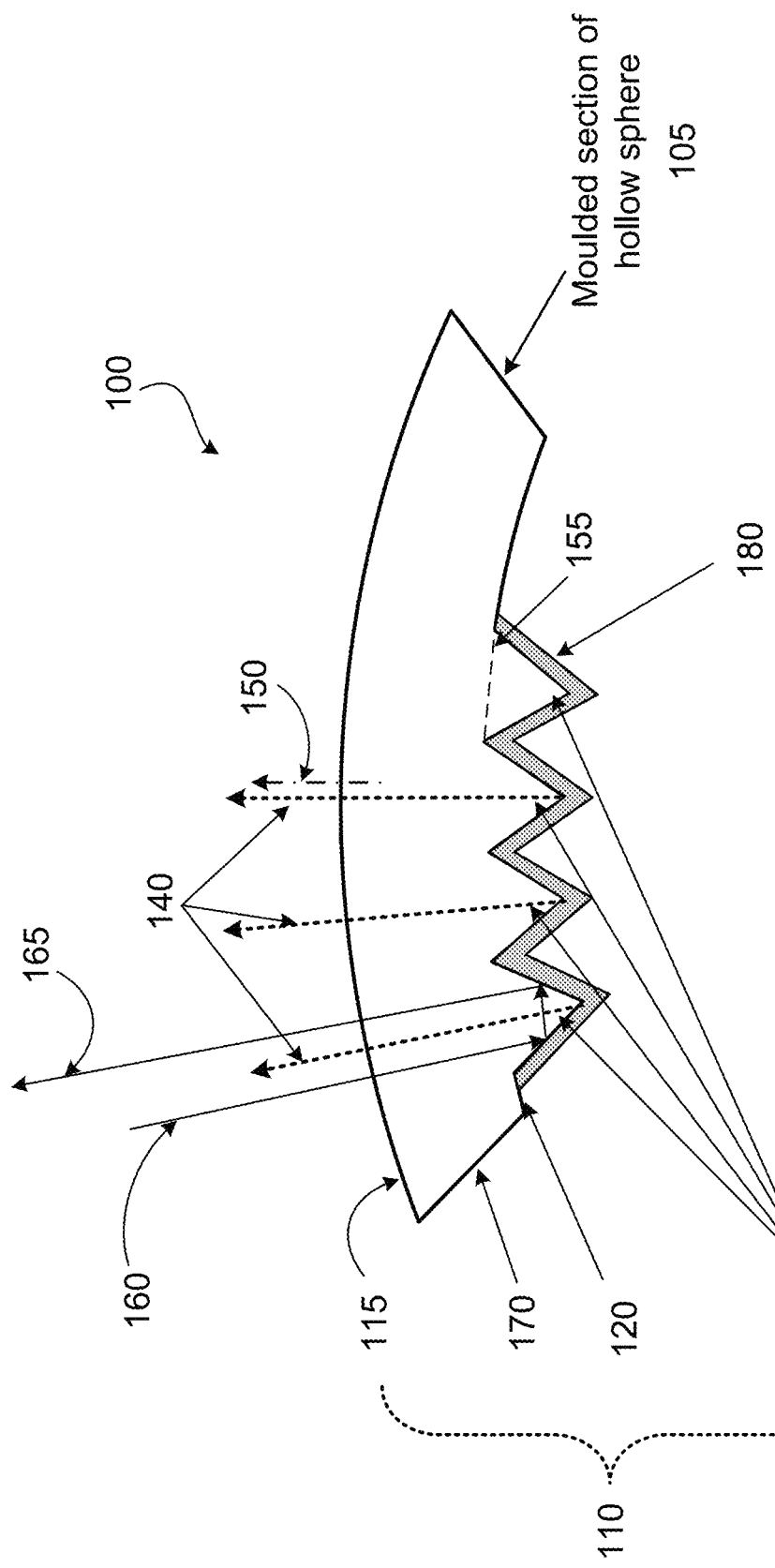
FIG. 1 shows an example of a retro-reflective section in an apparatus.

Described herein is an apparatus usable by a tracking system for optical tracking of various objects in an environment (e.g., optically tracking tools being used in a surgical theater). In some implementations, t apparatus can be utilized to produce a marker (e.g., a retro-reflective marker) usable by the tracking system. A tracking system is generally configured to determine a pose (e.g., positions and corresponding orientation) of a tracked object present in an environment. A tracked object generally includes one or more retro-reflective markers that may be similar or different (e.g., similar structure, different capabilities, etc.). These retro-reflective markers are configured to receive incoming signal beams (e.g., light beams) along one or more directions (e.g., from a signal source) and provide reflected signals to the tracking system. One or more sensors included in the tracking system are positioned near the signal source and configured to receive signals reflected by the retro-reflective markers. Once received by the sensor(s), the reflected signals can be processed (e.g., based on the light paths of incoming and reflective signals and the reflected points) to determine pose information associated with the tracked object, and in some instances, this pose information can be further processed to attain even more information about the tracked object. In one example, the tracking system is configured to estimate the location of the markers in the environment based on where the reflected signal is detected. The pose of the tracked object is subsequently determined based on a pre-determined relationship between the pose of each of the markers.

In some implementations, a tracking system can be an optical tracking system that operates in the optical portion of the electromagnetic spectrum, and the signal source can emit as optical signals (e.g., light beams) with various wavelengths (e.g., visible light beams, invisible light beams such as infrared, ultraviolet, etc.). The retro-reflective capabilities of the markers allow an optical signal to be reflected along a parallel path back toward the source (e.g., a reflected optical signal propagates along a path that is parallel to a path of the incoming optical signal). Various equipment, techniques, etc., can be employed by the system to detect the reflected optical signals. For example, one sensor or multiple sensors (e.g., similar or different sensors) such as one or more cameras can be configured to detect a retro-reflection (e.g., a glint) from one or multiple markers.

The described apparatus and corresponding markers can be utilized in various applications such as medical applications, industrial metrology, navigation, fields employing medical devices, etc. For example, a marker described herein can be connected to a medical device for tracking the pose of the medical device during a procedure (e.g., a surgical procedure).

Retro-reflective markers can include 2D markers that are predominately two-dimensional in shape (e.g., a 2D flat sheet having retro-reflective capabilities), 3D markers (e.g., markers and associated structures having a 3D geometry such as a spherical shape, a conical shape, a cylindrical shape, etc.), combination of 2D and 3D markers, etc.

2D and 3D markers have retro-reflective microelements located on at least one side (or surface). A microelement generally refers to a small component or unit included in a retro-reflective marker, portion of a marker, etc. to provide the reflective properties. For example, an average edge size of a microelement can be less than 1 millimeter. Microelements are typically designed to redirect incident optical signals back toward its source along substantially the same path. Microelements can take various forms, such as microprisms (also referred to as micro-corner cubes), microbeads (also referred to as micro cat-eye elements or microspheres), etc. and are often arranged in specific patterns or configurations to maximize the retro-reflective effect. In general, a 2D marker can have multiple microelements affixed on one surface of the 2D marker. Similarly, a 3D marker can have multiple microelements affixed to one or multiple surfaces (e.g., an inner surface, an outer surface, or both) of the 3D structure.

For some manufacturing techniques, a 3D marker is produced by forming a 3D structure out of a corresponding 2D marker sheet. For example, a 2D marker with multiple retro-reflective microelements is heated (e.g., by a heating system) and placed on a mold with a desired geometry. The 2D marker sheet is manipulated into the desired geometry by external pressure. For example, one or more vacuums can be applied (referred to as vacuum forming) to shape the 2D marker sheet into a 3D marker. However, such a process can alter individual microelements, the distribution of the microelements, etc., along with other aspects of the 2D marker sheet. The resulting 3D marker may have an undesired distribution of microelements, e.g., a non-uniform distribution of retro-reflective microelements. Additionally, one or more microelements of the 2D marker sheet might be deformed from their desired shape during production (e.g., a manufacturing process). The changes in the microelement distribution, shape of the 2D marker sheet, and the shape of microelements in the 2D marker can reduce the tracking accuracy for a tracking system using the resulting 3D marker produced by the conventional technique. Another conventional technique includes producing a marker that includes a 3D structure that has one or more retro-reflective microelements affixed to the structure (e.g., affixed to at least one side or surface of the structure). However, the affixing process can be inefficient, costly, and the uniformity of the microelement distribution is difficult to control.

One or more techniques can be employed for producing a 3D retro-reflective marker that includes one or more retro-reflective sections manufactured using injection molding. By utilizing injection molding, the described retro-reflective section can have multiple retro-reflective microelements that are uniformly distributed and accurately oriented as pre-determined, which leads to more consistent brightness of the retro-reflected optical signals (e.g., light beams) produced by the retro-reflective sections from incoming lights at different incident angles and from different directions. The consistent uniformity of brightness for different incident angles improves the tracking accuracy of a tracking system using the described apparatus or one or more corresponding markers. In some implementations, 2D markers can also be manufactured using the injection molding technique described herein.

In general, injection molding involves injecting molten molding material into a mold. The mold is shaped with a desired 3D structure with a pre-determined arrangement of microelements (e.g., the shape, size, orientation, and distribution of the microelements). In some arrangements, the mold is then cooled to solidify the molding material. Once the molding material is fully solidified, the retro-reflective section is removed from the mold, and the retro-reflective microelements located on the retro-reflective section should have the desired distribution and shape as provided by the mold. The molding material can include various types of materials, such as polymers (Acrylic, Silicone, etc.) that are transmissive in the near-infrared (NIR) spectrum band. The molding material may attenuate optical signals in the visible spectrum (e.g., 400-740 nm). In this way, the molding material can filter visible light and be compatible with optical sources in the NIR spectrum band. However, the molding material can be selected to filter optical signals in different spectrum bands as long as the molding material is compatible with the optical source for tracking objects.

FIG. 1 shows an example of a retro-reflective section 105 in apparatus 100. In this example, the retro-reflective section 105 has a geometry of a spherical body segment; however, it should be noted that the geometry and the shape of apparatus 100 are examples for the purposes and convenience of illustration. Other geometries and shapes of apparatus 100 can be utilized.

The retro-reflective section 105 can be manufactured using injection molding, as described above. Retro-reflective section 105 can be a portion of a 3D marker with a particular geometry. For example, retro-reflective section 105 can form a portion of a 3D marker with a hollow spherical shape (e.g., a spherical shape marker 600 shown in FIG. 6A). One or more other geometries can be employed, for example, the retro-reflective section 105 can form a portion of a 3D marker with a cylindrical shape (e.g., a cylindrical shape marker 650 of FIG. 6B).

Retro-reflective sections can be assembled together to form a 3D marker (e.g., markers 600 and 650 of FIGS. 6A and 6B, respectively) using one or more coupling mechanisms provided on the retro-reflective sections. In general, a coupling mechanism refers to a mechanism or structure that enables the attachment or connection of one or more retro-reflective sections. Common examples of a coupling mechanism include adhesives, heat sealing, bonding agents, mechanical connectors like joints, hooks, and loops, etc. Using the coupling mechanism, multiple retro-reflective markers can be coupled with one another to form a more complex and larger marker structure. A corresponding 3D marker can be formed by assembling more than one retro-reflective section, e.g., two, five, ten, or other suitable numbers of retro-reflective sections, using one or more coupling mechanisms provided by each of the retro-reflective sections.

For example, retro-reflective marker 105 of apparatus 100 can include a coupling mechanism 170 on at least one side. For example, the coupling mechanism 170 can include a joint for interlocking a corresponding joint of another retro-reflective section. The joint can include a dovetail joint (not shown) that includes a trapezoidal-shaped groove, and the corresponding dovetail joint of a corresponding retro-reflective section can include a corresponding projection or extrusion configured to fit into the trapezoidal-shaped groove to form an interlocking connection. In some cases, each retro-reflective section can include a groove on each of one or more sides for receiving corresponding protrusions from other retro-reflective sections and a protrusion on each of one or more other sides to be received by other retro-reflective sections. In addition, the dovetail coupling mechanism ensures a reliable and sturdy coupling between different retro-reflective sections and allows for quick assembly and disassembly when needed, which facilitates the production of versatile retro-reflective markers with adjustable configurations to suit different tracking tasks and requirements. In some implementations, heat sealing can be applied to couple or seal two or more retro-reflective sections that are deformable due to heat (e.g., thermoplastic materials). Heat sealing generally refers to techniques to couple two or more materials together using heat. For example, welding techniques such as friction welding or ultrasonic welding can be used to create frictional heat between retro-reflective sections to soften and bond the sections. Alternatively or in addition, one or more laser sources can be used to heat up retro-reflective sections. In some implementations, one or more materials can be used as bonding or interface material for welding retro-reflective sections.

Retro-reflective section 105 further includes a retro-reflective section 110. The retro-reflective section 110 includes an outer surface 115, an inner surface 120, and multiple retro-reflective microelements 130. The outer surface 115 defines a surface normal in a direction extending away and perpendicular to a local tangential of the outer surface 115. Generally, except for a flat surface, the surface normal of the outer surface 115 generally varies at different locations on the outer surface 115. For example, the surface normal 150 of the outer surface 115 can change orientations at different locations on the outer surface 115. Similarly, an inner surface 120 defines a surface normal in a direction extending away and perpendicular to a local tangential of the inner surface 115. The surface normal of the inner surface 120 can correspond to the surface normal of the outer surface 115 when the inner surface 120 and the outer surface 115 have a common curvature profile. In implementations where the outer surface 115 and the inner surface 120 do not share a common curvature profile, the surface normal of corresponding surfaces generally do not align with each other.

The outer surface 115 and inner surface 120 are generally smooth for better retro-reflectivity. In some implementations, however, a portion of the outer surface 115, the inner surface 120, or both can be non-smooth (e.g., have a rough surface). The level of non-smoothness, the location of non-smoothness, and the size of non-smooth regions, etc. are determined according to different requirements for retro-reflection tasks.

In this example, the retro-reflective section 105 includes multiple retro-reflective microelements 130 extending from the inner surface 120 at different locations. Each of the multiple retro-reflective microelements 130 defines a central axis 140 extending along a respective direction that corresponds to the surface normal 150 of the outer surface 115. Retro-reflective microelements that each have a central axis aligned with the surface normal 150 improve the retro-reflectivity of section 105 (e.g., the consistency in retro-reflective brightness). In general, a central axis of a retro-reflective microelement is represented by a vector passing through the geometric center of the retro-reflective microelement. For cases where a retro-reflective microelement is not symmetric (e.g., having different edge sizes, non-perpendicular inner angles or skewed, etc.), a central axis of the retro-reflective microelement is defined as an axis passing through the geometry center having the same angle with respect to all edges formed by two adjacent surfaces of the retro-reflective microelement. Equivalently, the central axis has the same angle with respect to the normals of all surfaces of the retro-reflective microelement. In cases where a retro-reflective microelement is a corner cube having edges of the same length, a central axis of the retro-reflective microelement can be an axis passing through the geometry center and perpendicular to a base 155 of the retro-reflective microelement.

In some implementations, the microelements 130 can be designed to have central axes 140 extending in a direction parallel to the surface normal of the inner surface 120. By having the central axes 140 and the surface normal 150 align, the retro-reflective section 105 can improve the brightness consistency of the generated retro-reflected optical signals (represented by graphical arrow 165), which propagates in a direction that is parallel to the propagation direction (but in the opposite direction) of an incoming optical signal (represented by graphical arrow 160).

In addition, retro-reflective section 105 further includes one or more coatings, such as a reflective coating 180 deposited on surfaces of the multiple retro-reflective microelements 130. The reflective coating 180 can enhance the retro-reflectivity of microelements 130. The reflective coating 180 can include one or more materials (such as silver, aluminum, etc.) that can be deposited individually or in combination. The reflective coating 180 can be applied to the microelement surfaces using various techniques. One example technique described herein relates to vapor deposition. In general, vapor deposition is a process of applying a thin layer of reflective coating using a vacuum-based deposition technique. To deposit, at least a portion of the retro-reflective section 105 (e.g., the multiple microelements 130) is placed inside a vacuum-sealed deposition chamber. The coating material is vaporized by heat and provided to the deposition chamber. Once the vaporized coating material hits the target surface (e.g., the surfaces of the microelements 130), the vaporized coating material quickly condenses and forms a thin layer of reflective material on the target surface. No air gap remains between the reflective coating and the microelement surfaces.

In some implementations, the reflective coating can be bonded to the retro-reflective surfaces using other techniques such as chemical deposition, spray coating using spray guns or atomizers, etc.

The thickness of the reflective coating can be controlled by adjusting parameters such as deposition time, vapor temperature, distance between the coating source and the surface, etc. In general, the thickness of the reflective coating can be particularly designed to achieve at least 85 percent and above reflectivity at all points on the outer surface of the retro-reflective section. Since microelement surface normals vary across the retro-reflective section, the thickness of the reflective coating changes accordingly to achieve a desired retro-reflectivity. For example, the thickness can be 10 ums, 20 ums, 50 ums, 100 ums, 200 ums, 500 ums, 1 mm, or other suitable values. In some cases, the thickness of the reflective coating can be higher in the valleys between microelements than those on the surfaces of the microelements such that sufficient reflective coating can be applied to the surfaces of the microelements to achieve a desired level of retro-reflectivity.

As described above, whether to deposit a reflective coating over the retro-reflective layer depends on the requirements for retro-reflectivity. For example, a retro-reflective section without a reflective coating can provide a "brighter" region under incoming optical signals, and a retro-reflective section with a reflective coating can provide a wider viewing angle for incoming optical signals. In cases where a wider viewing angle for retro-reflectivity is not needed or desired, the retro-reflective section 105 can provide retro-reflection by multiple reflective surfaces of the microelements without depositing a reflective coating on the reflective surfaces (not shown in FIG. 1). In these cases, the reflective surfaces are the surfaces of the plurality of microelements. For example, a microelement can have two surfaces serving as the reflective surfaces to reflect or retro-reflect incoming visual signals. Thus, the retro-reflective section 105 can have a lower manufacturing cost yet with a slightly smaller viewing angle for the retro-reflectivity.

In addition, instead of extending from the inner surface 120, one or more retro-reflective microelements can extend from the outer surface 115 at different locations of the outer surface 115 (not shown in FIG. 1). In these cases, the retro-reflective microelements must be further covered by a reflective coating deposited on the surfaces of the retro-reflective microelements 130 to ensure or enhance retro-reflectivity. More specifically, a surface without a reflective coating generally does not retro-reflect an incoming optical signal traveling from a medium of a lower refractive index to a higher refractive index, e.g., from air to a polymer. In addition, for cases where the retro-reflective microelements extend from the outer surface 115, having a reflective cover deposited on the surfaces of the retro-reflective microelements 130 can provide a wider viewing angle for the retro-reflectivity, as described above.

Furthermore, since these retro-reflective microelements 130 are located on the outer surface 115, liquid and dust in the environment can get stuck in the gaps between then, harming the retro-reflectivity of retro-reflective section 105. Thus, retro-reflective section 105 may be further protected by a transparent or translucent cover so that retro-reflective microelements are shielded from contamination caused by liquid or dust in the environment.

In some implementations, the retro-reflective section 105 forms an entire 3D marker (e.g., a hollow spherical, conical, or cylindrical shape). In these implementations, the retro-reflective section 105 might not have any coupling mechanism 170.

FIGS. 2A, 2B, and 2C each present a bottom view of different example retro-reflective sections that could be employed separately or together in an apparatus (e.g., apparatus 100 of FIG. 1). The apparatus described herein can include multiple retro-reflective microelements extending away from an inner surface of the apparatus. In general, retro-reflective microelements can have different geometries and shapes. For example, a retro-reflective microelement can be a micro-bead (also referred to as a micro-sphere or a cat-eye shape) or a microprism (also referred to as a corner cube). FIGS. 2A, 2B, and 2C each include bottom views of different microprism geometries in the respective retro-reflective section.

As shown in FIG. 2A, a retro-reflective section 205 (e.g., of an apparatus) includes a two-dimensional array (referred to as array 210) of retro-reflective microprisms 210*a, b, c, d, e, f, g, h, i, j, k, l, m, n, p* extending from the inner surface 207 of the retro-reflective section 205. In this configuration, each microprism has a top vertex 220 and three bottom vertices 225. Each microprism 210*a-p* includes multiple edges 230 (e.g., three side edges and three bottom edges). Each of the three side edges connects the top vertex 220 and one of the three bottom vertices 225, and each of the three bottom edges connects two neighboring bottom vertices 225. Since retro-reflective section 205 might have a curvature, the three bottom edges 225 are not necessarily straight lines. For example, the three bottom edges 225 can be curved edges. The bottom edges generally form a triangular shape. The spatial angles between neighboring side surfaces 235 of a microprism can be substantially 90 degrees to form a cube corner. More specifically, a cube corner (also referred to as a corner reflector) generally comprises three flat surfaces intersecting at right angles to each other. It is configured to reflect optical signals back to the optical source in a direction parallel to the incident directions but with a positional shift. The three intersecting surfaces of the cube corner reflector are typically square in shape. As for microprism, the spatial angles between connecting surfaces can include other suitable degrees besides 90 degrees according to different retro-reflective tasks. For example, the spatial angles can range between 75 degrees to 105 degrees to account for situations where one or more optical sources are located offset from one or more optical sensors.

Multiple parameters associated with retro-reflective microelements can be adjusted to control the brightness and uniformity of the retro-reflected signal. These parameters can include a total number of microelements, a size of individual microelements, inner angles of the microelements, etc. In some situations, the microprisms $210a\text{-}p$ are designed such that each edge 230 is less than 1 millimeter, and the distance D (shown in FIG. 2A) between two neighboring top vertices 220 is less than 1 millimeter.

Achieving precise and uniform surface form in a microprism structure is crucial for optimizing retro-reflective performance. Irregularities or imperfections in the surface form can lead to reduced retro-reflection efficiency or scattering of optical signals. To control the brightness of retro-reflected optical signals over differences up to 15 degrees, the surface form of each microprism $210a\text{-}p$ is molded with a surface finish of less than 1 micrometer. The term "surface form" generally refers to the magnitude of deviations from the desired or intended shape of a retro-reflective microelement. As an example, surface form can characterize a defect or deviation in a radius, curvature, etc. in a surface of a retro-reflective microelement. As another example, surface form can also characterize a deviation in the angle of adjacent side surfaces from the desired angles. The term "surface finish" generally refers to the level of quality and precision of a surface of the retro-reflective microelement. Surface finish can be represented using parameters such as roughness, waviness, lay, etc. of a microelement surface. Since surface form generally relates to deviations from the desired shape or specified tolerances, and surface finish relates to the texture, quality, and characteristics of the outermost layer of a surface. Surface form defects are also referred to as "low-frequency deviations" and surface finish defects are referred to as "high-frequency deviations."

In order to improve the overall consistency in the brightness of retro-reflective light and, optionally, increase the range of incident angles that allows for retro-reflection, the microprism array 210 may be designed to offset central axes' directions. More specifically, one or more microprism can be selected to perturb the directions of their respective central axes such that these central axes deviate from their corresponding surface normal directions by a respective pre-determined offset value. The process for offsetting the directions of one or more central axes can be performed using a randomization algorithm, which is configured to, once executed, sample central axes according to a pre-determined distribution, and perturb directions using values within a pre-determined range. Although the overall brightness of retro-reflected optical signals might decrease due to the offset values, the overall viewing angle increases. And since the sampling and perturbation are controlled using a randomization algorithm, the described techniques ensure a uniform brightness loss and prevent a high gradient in brightness across different local regions of the retro-reflective section, thus leading to an improvement in the brightness consistency at different orientations. Details of the randomization algorithm and corresponding examples are described with reference to FIGS. 3, 4A, 4B, 4C, 5A, 5B, and 5C.

In addition, other parameters of the microprism $210a\text{-}p$ can be perturbed to improve the functionality of a retro-reflective section. For cases where the optical source is not coaxially orientated with an optical sensor (e.g., offset in parallel), to further improve the overall consistency of brightness for retro-reflective sections at different locations between the retro-reflective section and a corresponding optical sensor, a similar randomization algorithm can be applied to perturb the spatial angles of a retro-reflective microelement. Using the microprism $210a\text{-}p$ as an example, the spatial angles between side surfaces 235 and the overall sizes of different microprisms $210a\text{-}p$ can be sampled and perturbed within a pre-determined range to increase the overall brightness consistency of the retro-reflective section at the cost of the slight decrease in the overall brightness of retro-reflected optical signals. FIG. 2B shows another example micro-prism geometry. Similarly, retro-reflective section 245 includes a two-dimensional array of microprisms. Each of the microprisms includes a top vertex 240 and six bottom vertices. Each microprism includes multiple edges 250 (e.g., three side edges and six bottom edges). Since retro-reflective section 245 generally has a curvature, the bottom edges are not necessarily straight lines; they can be curved edges. The bottom edges generally form a hexagonal shape. The spatial angles between neighboring side surfaces of each microprism can be substantially 90 degrees to form a cube corner. In some implementations, the spatial angles between connecting surfaces can include other suitable degrees accordingly to different retro-reflective tasks. To achieve the desired level of brightness, the length of each edge is less than 1 millimeter, and the distance D between two adjacent top vertices 240 is less than 1 millimeter. In addition, the geometries of one or more microprisms in FIG. 2B can be sampled and perturbed in a similar fashion to the above described with respect to FIG. 2A.

FIG. 2C shows yet another example microprism geometry. Similarly, retro-reflective section 265 includes a two-dimensional array of microprisms. Each of the microprisms includes top vertex 270 and five bottom vertices. Each micro-prism includes multiple edges 280 (e.g., three side edges and six bottom edges). Since retro-reflective section 265 generally has a curvature, the bottom edges are not necessarily straight lines; they can be curved edges. The bottom edges generally form a rectangular shape. The spatial angles between neighboring side surfaces of each microprism can be substantially 90 degrees to form a cube corner. In some implementations, the spatial angles between connecting surfaces can include other suitable degrees accordingly to different retro-reflective tasks. To achieve the desired level of brightness, the length of each edge is less than 1 millimeter, and the distance D between two adjacent top vertices 270 is less than 1 millimeter. In addition, the geometries of one or more microprisms in FIG. 2C can be sampled and perturbed in a similar fashion to the above described with respect to FIG. 2A.

In some implementations, more or less bottom vertices can be included (e.g., four, seven, ten, or other suitable numbers of vertices). The bottom edges can form any suitable polygons and even a circle. In addition, although the bottom views of bodies 205, 245, and 265 are shown in rectangular shapes for the convenience of illustration, the shape and size of a retro-reflective section can include any suitable form. The arrangement, number, and size of microprisms can be different accordingly to different retro-reflective tasks.

The randomization algorithm described herein for perturbing the spatial angles of a retro-reflective microelement can be performed over a building block of a retro-reflective section. In general, a building block can include at least a subset of the retro-reflective microelements in the retro-reflective section. For simplicity, the description below assumes that the spatial angles in a retro-reflective microelement are identical, which is referred to as a cube angle of the retro-reflective microelement.

The randomization algorithm, once executed, can perturb the cube angle of each retro-reflective microelement in the building block. The perturbation pattern in cube angles (also referred to as cube angle variation below) generated by the randomization algorithm for the building block can be repeatedly copied for perturbing cube angles of other retro-reflective microelements in the retro-reflective section (or those in the retro-reflective marker assembled by multiple retro-reflective sections). This way, the retro-reflective marker or section can include one or more building blocks with the same cube angle variation. These building blocks can substantially cover the inner surface of the retro-reflective marker or section. In some implementations, these building blocks can be arranged adjacent to each other without overlap and gap. Alternatively, these building blocks can be arranged next to each other with a gap. For example, the gap can span between 0 microns to a size comparable to the size of a building block.

Figure 3:
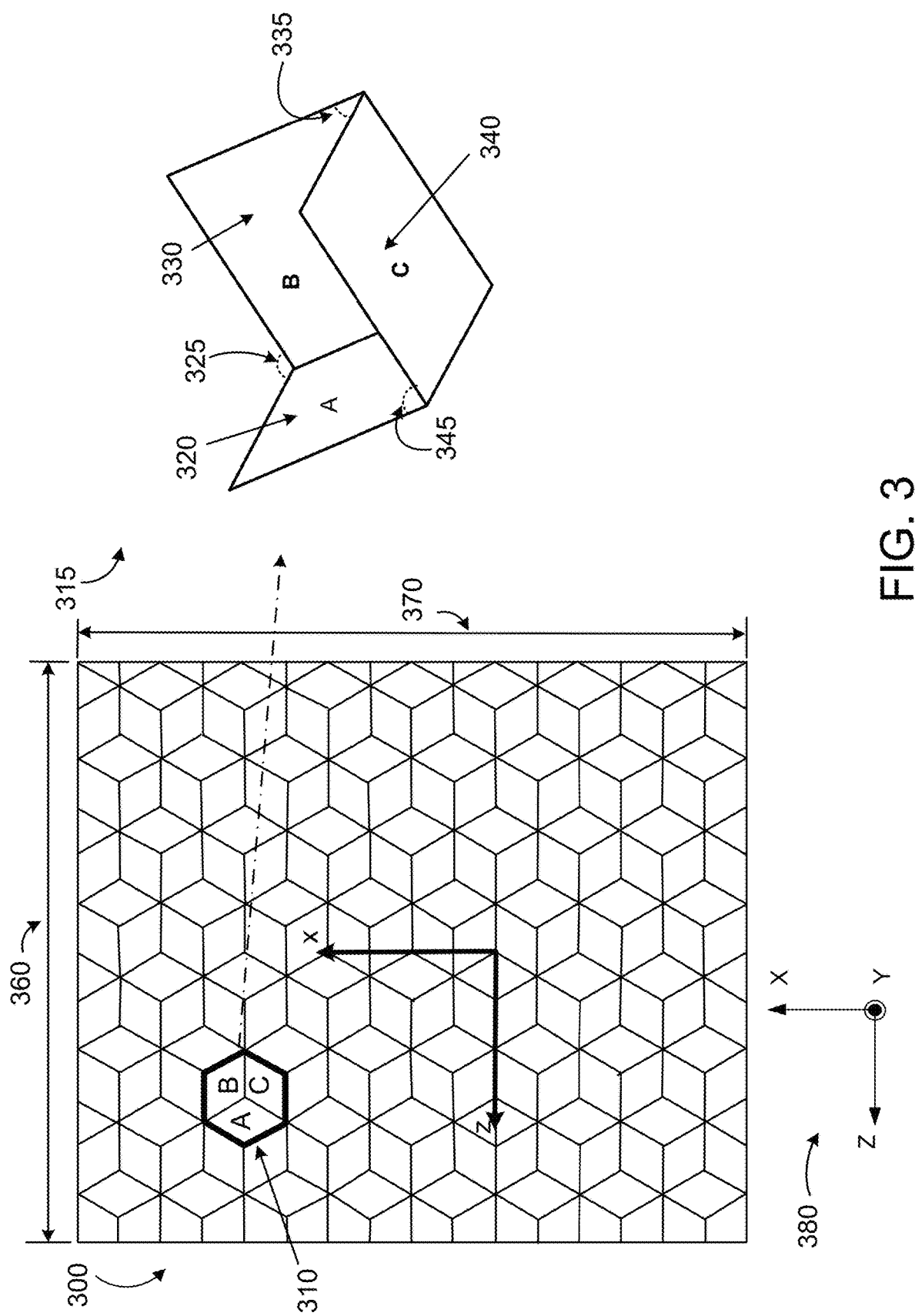
FIG. 3 shows an example of a building block with cube angle variation.

FIG. 3 shows an example of a building block 300 with cube angle variation. For illustration and simplicity, FIG. 3 is a top view of building block 300 in the coordinate system 380. Each microelement in building block 300 has a hexagonal shape similar to that described in connection with FIG. 2B. Note that the building block 300 and the corresponding cube angle variation can be applied to a flat surface or a curved surface. Examples of applying to a flat surface are described with reference to FIGS. 4A, 4B, and 4C, and applications to a curved surface are described with reference to FIGS. 5A, 5B, and 5C.

As shown in FIG. 3, building block 300 has an N by M array of retro-reflective microelements. Here, building block 300 has an 8 by 8 retro-reflective microelements. Note that building block 300 can include other suitable numbers of microelements for either edge 360 or 370, e.g., three, four, five, nine, eleven, or other suitable numbers of microelements.

Each microelement defines a cube angle to be perturbed by the randomization algorithm. For example, microelement 310 defines three intersecting planes or surfaces A, B, and C. In a magnified view 315 of the microelement 310, numerical identifier 320 refers to surface A in the microelement 310, numerical identifier 330 refers to surface B in the microelement 310, and numerical identifier 340 refers to surface C in the microelement 340. In addition, two different surfaces define a respective planar angle at the corresponding intersection. As shown in the magnified view 315 of the microelement 310, surfaces 320 and 330 define a planar angle of 325, surfaces 330 and 340 define a planar angle of 335, and surfaces 320 and 340 define a planar angle of 345. For simplicity, the description herein assumes that planar angles 325, 335, and 345 are identical, which are also referred to as a cube angle as described above. Thus, the randomization algorithm described herein, when executed, perturbs the cube angle for each microelement in the building block so that each microelement has a respective perturbed cube angle.

The randomization algorithm for perturbing the cube angles of microelements in the building block can be implemented using random seeds and bins. More specifically, a system (e.g., a computer system with a processor) implementing the randomization algorithm can receive data from a user for perturbation. The data can include a base cube angle, a range of angle perturbation, a distribution for perturbation, random seeds for reproducibility, and a number of bins for controlling the granularity of the perturbation within the range. For example, the base cube angle can be 90 degrees, and the range of angle perturbation can be one degree, two degrees, four degrees, or other suitable degrees. As another example, the distribution for generating random seeds can include a Gaussian distribution, Poisson distribution, or other suitable distributions or combination of distributions. As another example, the random seeds can be based on a current machine time or other suitable mechanisms.

After receiving the user data, the system can first divide the range of angle perturbation into a number of bins, each bin represents a respective portion of the perturbation range. For example, a perturbation with a range from zero to two degrees can be divided into eight bins, i.e., [0, 0.25), [0.25, 0.5), [0.5, 0.75), [0.75, 1), [1, 1.25), [1.25, 1.5), [1.5, 1.75), and [1.75, 2] degrees. Alternatively, the perturbation can include negative degrees, e.g., a variation between negative one degree and positive one degree. In these situations, the system can determine the bins to start from the minimal perturbation value (e.g., negative one degree) to the maximum value (e.g., positive one degree).

For each of the multiple bins, the system generates a random number from a particular distribution using one of the received random seeds. The random number can be a real number between zero and one. The system then scales the random number to fit within the range of variation allowed for the bin. For example, if the random number is 0.3 for the bin of [0.5, 0.75), the output perturbation is 0.575 degrees. As another example, if the random number is 0.7 for the bin of [1.25, 1.5), the output perturbation is 1.425 degrees. The system then applies the output perturbation values to the base cube angle value (e.g., 90 degrees as described above) to determine the perturbed angle value for the microelement. For example, the perturbed cube angle values can be 90.575 degrees, 91.425 degrees, 89.425 degrees, 88.575 degrees, or other suitable degrees.

The system repeatedly performs the above-described process for each microelement in the building block to determine all angle perturbations. Once the angle perturbation for all microelements is determined for the building block, the system can copy the cube angle variation in the building block to cover the surface of the retro-reflective section or the entire retro-reflective marker.

As described above, the cube angle variation generated by the randomization algorithm can be applied to a flat surface or a curved surface. FIG. 4A is a perspective view of a retro-reflective building block formed on a flat surface and having a rectangular geometry with varying cube angles. Building block 410 is presented according to the coordinate system 430. As shown in FIG. 4A, building block 410 has an eight-by-eight array of retro-reflective microelements, and each edge 415 or 420 has eight arrays of microelements along the corresponding edge direction.

Note that although FIG. 4A shows an eight-by-eight array of building block 410 for case of illustration, arrays of a different size can be adopted for a building block according to different requirements for cube angle variation. For example, a building block can have a five-by-five array of microelements, a six-by-six array of microelements, a ten-by-ten array of microelements, or other suitable sizes. In some implementations, a building block can have a rectangular array where the building block can have more microelements along a first edge than a second edge. For example, a building block can have a four-by-six array of microelements, a seven-by-three array of microelements, or other suitable sizes.

FIG. 4B shows an example retro-reflective building block formed on a flat surface with varying cube angles. Both building blocks 440 and 450 are presented in a top view in FIG. 4B. Both building blocks 440 and 450 include retro-reflective microelements extending from the corresponding inner surface (or bottom surface), and a respective reflective coating on the corresponding outer surface (or top surface). Building block 450 has a darker appearance compared to building block 440 because building block 450 is placed in a different orientation against the ambient lighting. Building block 440 has a different arrangement of retro-reflective microelements than building block 450. For example, building block 440 can have a different number of microelements, microelements with different cube angles, different gaps between neighboring microelements, microelements of different sizes, etc.

FIG. 4C shows another example retro-reflective building block positioned on a flat surface with varying cube angles. Building blocks 460 and 470 correspond to building blocks 440 and 450 of FIG. 4B, respectively, except that both building blocks 460 and 470 don't have a reflective coating. Building block 460 has the same pattern of microelements as building block 440 except for a reflective coating. Similarly, building block 470 has the same microelement pattern as building block 450 except for a reflective coating.

Figure 5B:
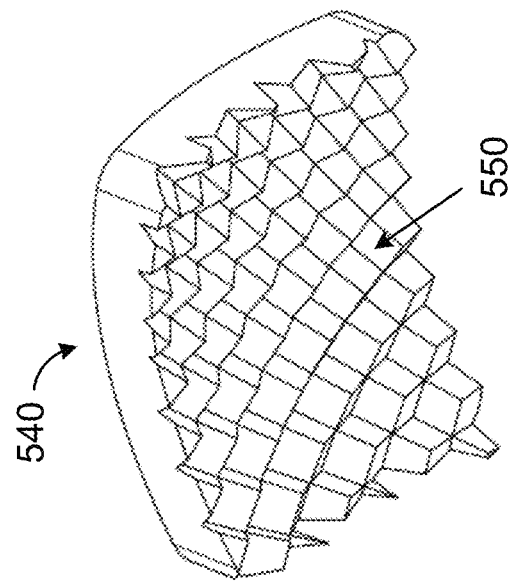
FIGS. 5A, 5B, and 5C are perspective views of an example retro-reflective building block forming on a curved surface with varying cube angles.
Figure 5A:
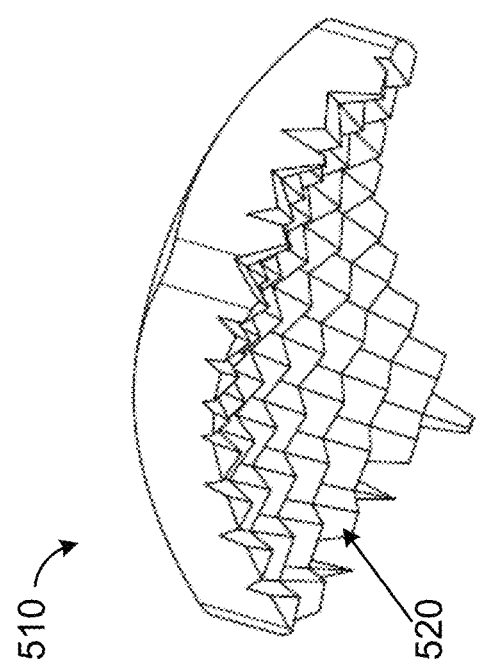
Figure 5C:
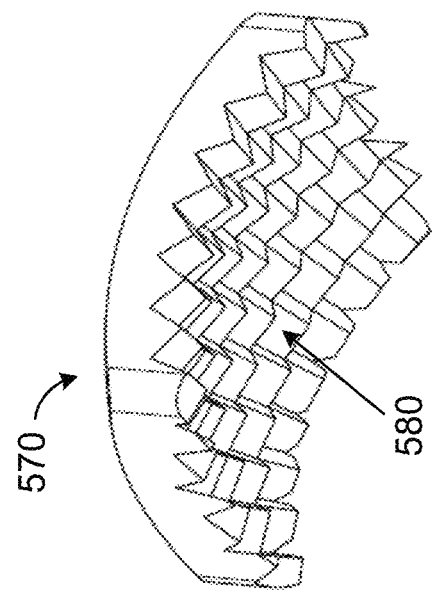

The cube angle perturbation can be applied to curved building blocks. For example, FIGS. 5A, 5B, and 5C are perspective views of an example retro-reflective building block forming on a curved surface with varying cube angles. Here, building blocks 510, 540, and 570 are different perspective views of the same curved building block. The retro-reflective microelements extend from the inner surface of the building block. Each microelement (e.g., microelement 520, 550, or 580) in the building block has a respective perturbed cube angle determined by the above-described randomization algorithm.

Furthermore, the tracking system can implement the randomization algorithm described herein to perturb other parameters. For example, the system can implement the randomization algorithm to perturb a spacing between two adjacent microelements. As another example, the tracking system can further implement the randomization algorithm to perturb the position, size, shape, or other parameters of each microelement in a building block and propagate such perturbations using building blocks for the retro-reflective section or marker.

Here are some examples of the above-described perturbation. Microelements can have a characteristic size (e.g., edge length) ranging between 20 μm to 30 μm, and can be perturbed by up to 1 μm. Microelements can be rotated from −20 degrees to +20 degrees, and the rotation can be perturbed by up to 1 degree. Spacing between microelements can vary such that each microelement is 10-50 μm away from its nearest neighbor, and can be perturbed by up to 1 μm.

Figure 6A:
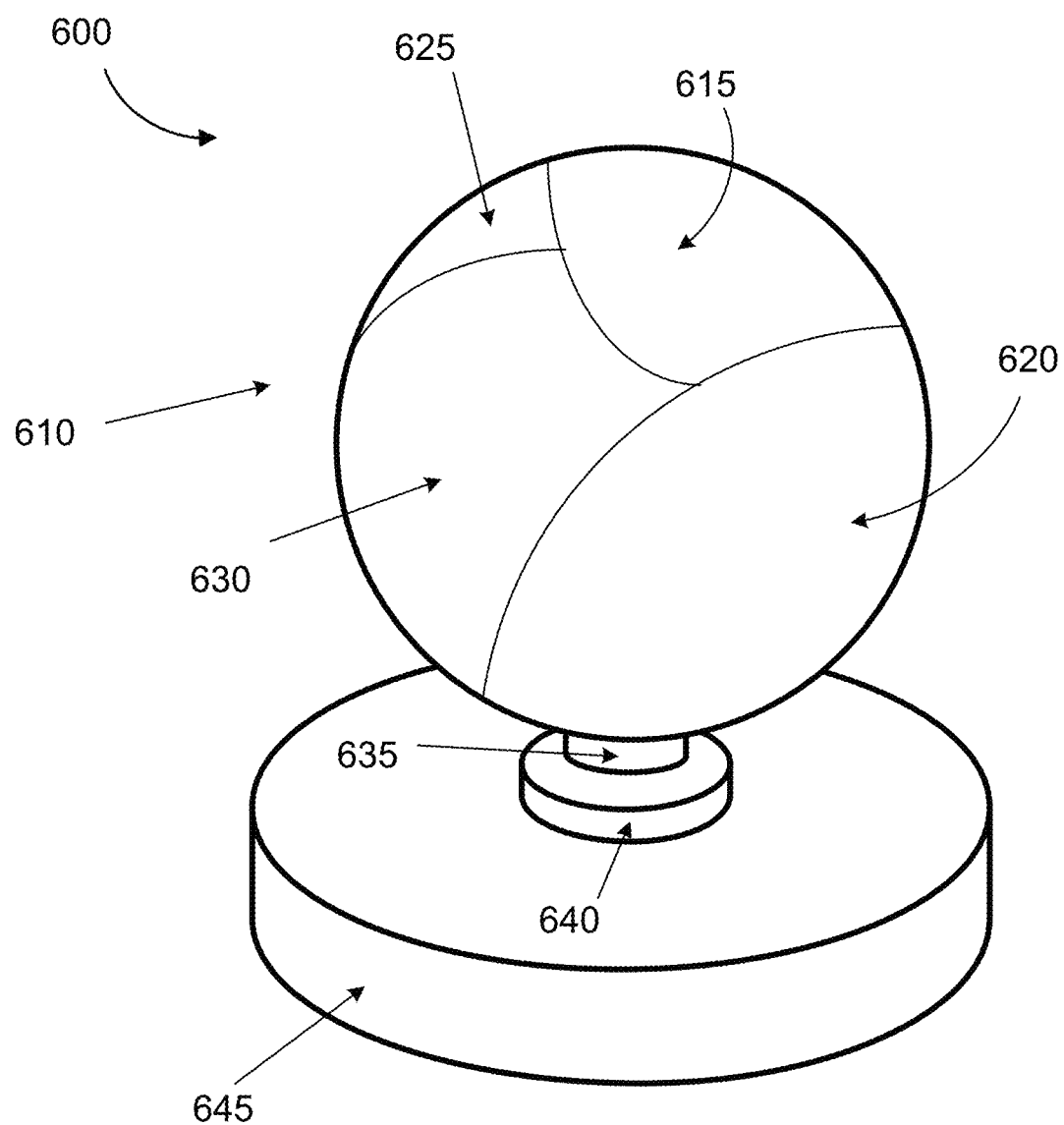
FIGS. 6A and 6B show example markers that include an retro-reflective assembly connected to a base, respectively.
Figure 6B:
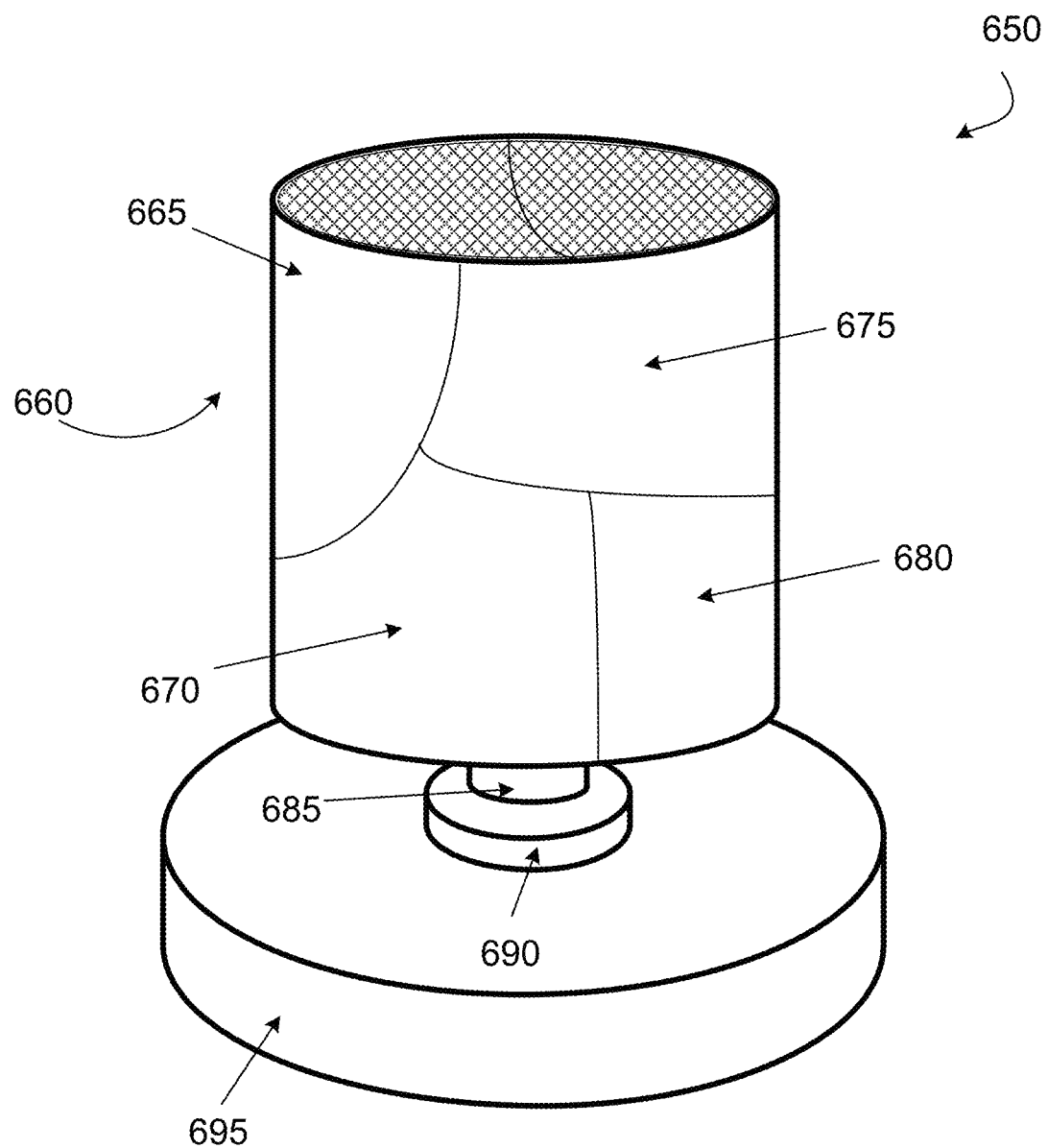

FIGS. 6A and 6B show examples of markers 600, 650 that each include a retro-reflective assembly connected to a base, respectively.

As shown in FIG. 6A, marker 600 includes a first portion 610 (also referred to as a retro-reflective assembly) including retro-reflective sections (e.g., sections 615, 620, 625, and 630 being viewable in the FIG. 6A). In this example, one or more retro-reflective sections 615, 620, 625, and 630 can couple with one another through coupling mechanisms of respective sections. One example coupling mechanism can include a joint including a groove or a corresponding protrusion. The assembled retro-reflective sections 615, 620, 625, and 630 of the first portion 610 generally form a hollow spherical marker.

Marker 600 further includes a second portion 635 with a connecting mechanism to connect the first portion 610 of marker 600 to device 645 for retro-reflective tracking. For example, the connecting mechanism is configured to connect the first portion 610 of marker 600 with base 640. The connecting mechanism can include threads, grooves, etc., to engage with corresponding threads, guides, and channels, located on base 640 of the marker. In some implementations, the second portion 635 can include a screw with threads on both ends for connecting corresponding threads in the first portion 610 and base 640.

The base 640 is attached to device 645 using different techniques. For example, the base 640 can be coupled to device 646 using a joint such that the first portion 610 of marker 600 is allowed for rotation around the joint formed between the base 640 and device 645.

Unlike the hollow spherical shape in FIG. 6A, FIG. 6B shows a marker 650 with a hollow cylindrical shape. Similarly, marker 650 includes a first portion 660 (also referred to as a retro-reflective assembly) including one or more retro-reflective sections 665, 670, 675, and 680. As described above, one or more retro-reflective sections 665, 670, 675, and 680 can couple with one another through coupling mechanisms of respective sections. One example coupling mechanism can include a joint including a groove or a corresponding protrusion.

Marker 650 further includes a second portion 685 with a connecting mechanism to connect the first portion 660 of marker 650 to a device 695 for retro-reflective tracking. For example, the connecting mechanism is configured to connect the first portion 660 of marker 650 with base 690. The connecting mechanism can include threads, grooves, etc. to engage with corresponding threads, guides, and channels, located on base 690 of the marker. In some implementations, the second portion 685 can include a screw with threads on both ends for connecting corresponding threads in the first portion 660 and base 690.

Similar to the above-described in connection with FIG. 6A, the base 690 can be attached to device 695 using a joint such that the first portion 660 of marker 650 is allowed to rotate around the joint formed between the base 690 and device 695.

Although FIGS. 6A and 6B, respectively, show markers with a spherical shape and a cylindrical shape for case of illustration; a marker can have other individual shapes (or multiple shapes) different or deviating from a spherical or cylindrical shape to accommodate different requirements for retro-reflectivity. For example, a marker can have a hollow conical shape (not shown). As another example, a marker can have a shape slightly different from a standard sphere or cylinder, e.g., an ellipsoid or other suitable shapes.

Figure 7:
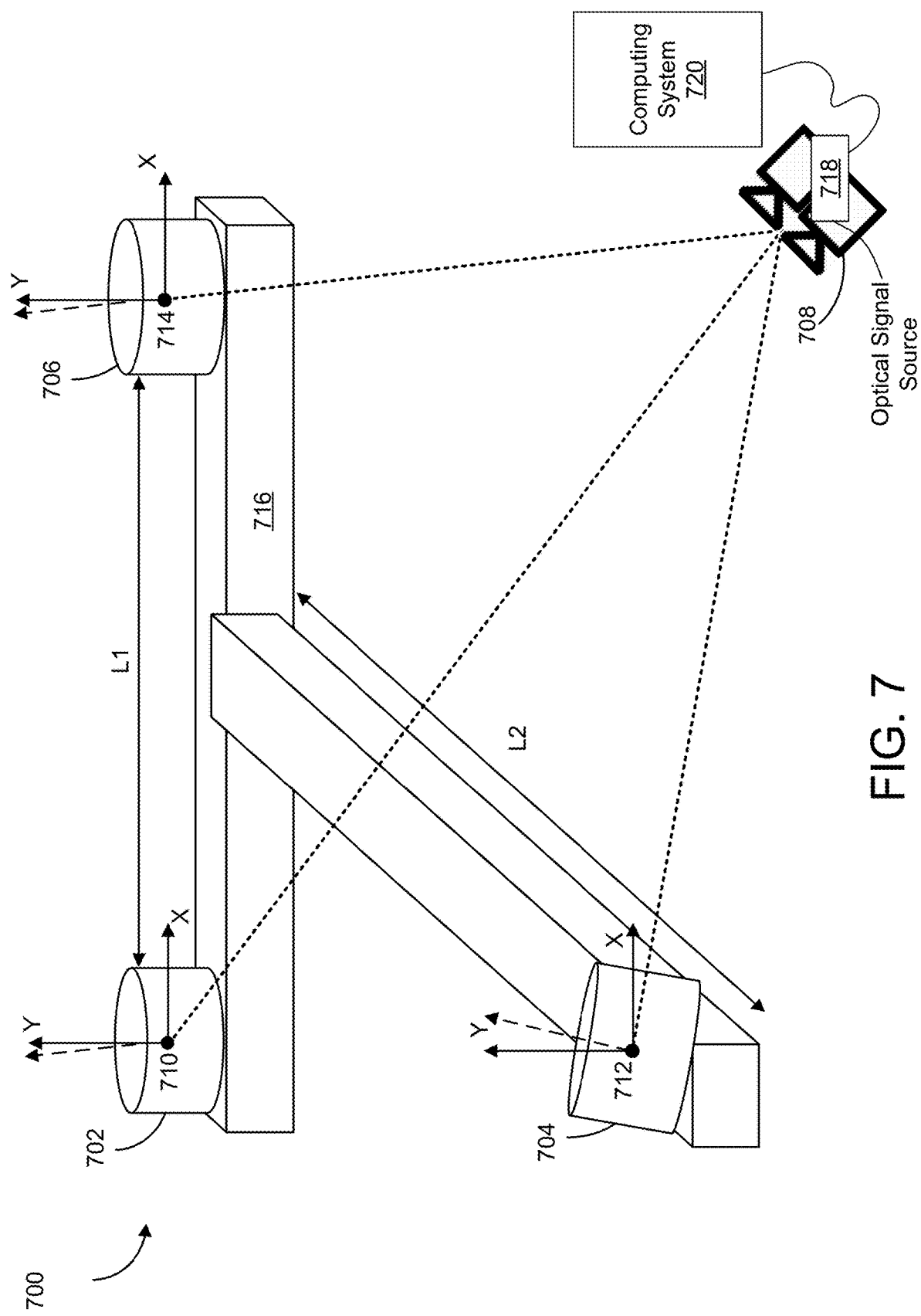
FIG. 7 is a perspective view of a tracking system that employs three markers affixed to an object for optical tracking track the object.

FIG. 7 is a perspective view of an example tracking system 700 that employs three markers 702, 704, and 706 affixed to an object for optical tracking. The markers 702, 704, and 706 are equivalent to or similar to markers 600 and 650 of FIGS. 6A and 6B, respectively. The markers 702, 704, and 706 can be formed by retro-reflective sections 105 of FIG. 1 and apparatus 200 of FIGS. 2A-C. For case of illustration, markers 702, 704, and 706 are depicted in a hollow cylindrical shape. However, other shapes and geometries are possible for different retro-reflective tasks. In some implementations, the object for optical tracking can include a reference tool placed near a patient during a surgical procedure, which establishes a fixed or reference coordinate for optical tracking. In addition, the object for optical tracking can further include a positioning tool used in a surgical procedure, and the markers can be used to determine the location and orientation of the positioning tool according to the reference coordinate.

As shown in FIG. 7, the example tracking system 700 includes a tracked object 716, markers 702, 704, and 706, an optical sensor 708 (e.g., a camera), an optical signal source 718, and a computing system 720. The tracking system 700 is configured to determine the position of the tracked object 716 in an environment by determining the pose of each marker 702, 704, and 706. The tracked object 716, as shown in FIG. 4, includes a crossbar structure with one end of a first beam coupled to a middle portion of a second beam. Marker 704 is located at the free end of the first beam and is spaced apart from the middle portion of the second beam at a distance of L2. Markers 702 and 706 are located at two free ends of the second beam and spaced apart at a distance of L1.

The optical signal source 718 is placed near optical sensor 708 and can include light-emitting devices such as light-emitting diodes (LEDs), an array of LEDs, or any other such source in the NIR spectrum. Optical sensor 708 can include a sensing device such as a CCD or CMOS optical sensor and is configured to capture reflected electromagnetic waves (e.g., optical signals) from markers 702, 704, and 706 attached to the tracked object 716. Due to the highly retro-reflective nature of the markers 702, 704, and 706, at certain wavelengths of electromagnetic waves, the markers appear as bright spots (the optical signatures) in the captured images. The captured sensor data is provided to the computing system for further processing.

The computing system 720 can determine the poses of tracked object 716 using the received sensor data, pre-determined parameters (e.g., locations) of the optical sensor 708, and initial locations and poses of markers 702, 704, and 706. In some implementations, the computing system 720 is configured to analyze pre-determined relationships between markers 702, 704, 706 and their respective retro-reflective centers to determine the poses of the tracked object 716. In some implementations, the computing system 720 can estimate offset values for retro-reflective centers based on the geometries of different markers.

Tracked object 716 can include any object to be tracked by the tracking system 700 but generally includes rigid or semi-rigid objects such that the markers 702, 704, and 706 do not move relative to one another in space during tracking. The tracked object 716 is generally configured to support multiple markers. Although there are three markers, 702, 704, and 706, coupled to the tracked object 716 in FIG. 7 for case of illustration, other numbers of markers can be coupled to the tracked object 716.

In some implementations, the tracked object 716 includes a tool for use during surgical tasks. In addition, or alternatively, the tracked object can be used for other applications and industries such as industrial metrology or navigation.

For example, the tracked object can include a digitizing probe for, e.g., full-field and/or tactile measurement, an optically-trackable scanner, a scale bar for photogrammetry and laser trackers applications, or other suitable devices. In addition, markers described herein can be attached to a device used in other industries that also utilize medical devices and other devices. In some implementations, markers described herein can be attached to one or more medical devices or other types of devices in concert.

Moreover, a tool used in different applications (e.g., surgical tracking, industrial metrology, or navigation, etc.) can be manufactured to have a body such that a portion of the body is manufactured to be retro-reflective (e.g., at least a part of the body is formed by retro-reflective section 105 in FIG. 1). This way, the tool does not need to be attached to a marker formed by one or more of the retro-reflective sections (e.g., retro-reflective section 105 in FIG. 1) for optical tracking. That said, in some implementations, a tool for optical tracking can be manufactured such that, in addition to a retro-reflective section forming at least a portion of the tool body, the tool can be further attached to a marker formed by one or more of the retro-reflective sections for enhanced retro-reflectivity.

Figure 8:
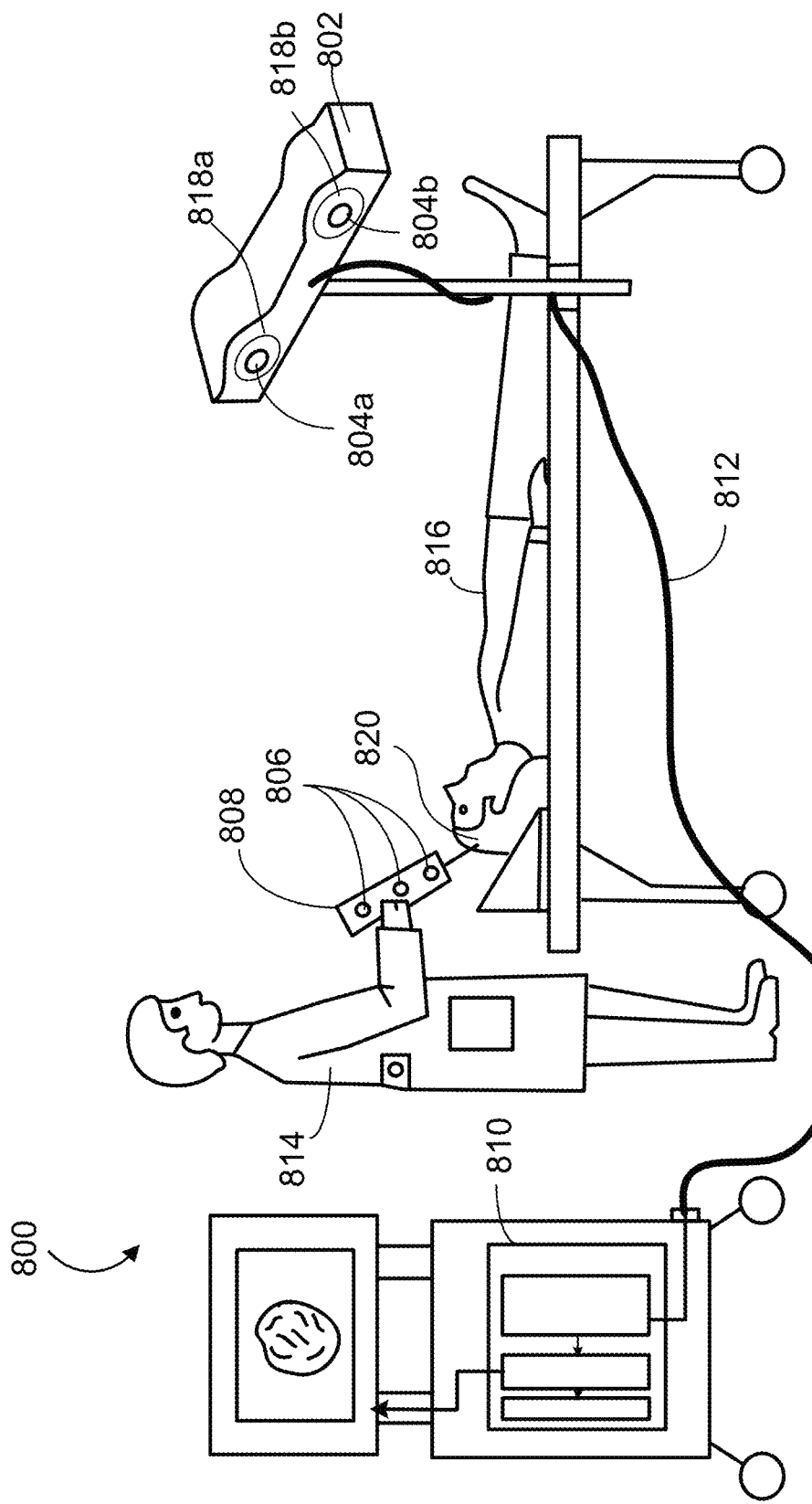
FIG. 8 shows an example tracking system capable of employing markers, for example, of FIGS. 1, 2A-C, 3, 4A-C, 5A-C, 6A, 6B, and 7.

FIG. 8 shows an example tracking system 800 (e.g., an optical tracking system) capable of employing markers, for example, of FIGS. FIGS. 1, 2A-C, 3, 4A-C, 5A-C, 6A, 6B, and 7. For example, the makers can be similar to the retro-reflective section 105 of FIG. 1, the retro-reflective marker 600 of FIG. 6A, the retro-reflective marker 650 of FIG. 6B, and the retro-reflective markers 702, 704, and 706 of FIG. 7. The tracking system 800 includes an illumination/image capture unit 802 in which a marker sensing device (e.g., a camera, an array of cameras 804a-b, etc.) and marker illuminating device(s) 818a-b (e.g., electromagnetic waves source) that are rigidly mounted. In this example, the illuminating devices 818a-b emit electromagnetic waves, such as visible light, infrared light, etc. The electromagnetic waves are directed at a region that includes one or more retro-reflective markers (e.g., markers 600 of FIG. 6A or markers 650 of FIG. 6B) that are affixed to a medical device (or an object). In the context shown in FIG. 1, the medical device (or an object) can be a tool 808 (e.g., a surgical tool, a medical device for treating a patient, etc.). The object is sometimes referred to as a tracked object. The retro-reflective markers are configured to have retro-reflectivity to reflect incoming electromagnetic waves in a parallel and opposite direction from the incoming direction. The cameras 804a-b capture one or more images of the illuminated retro-reflective markers. Due to the highly retro-reflective nature of the retro-reflective markers, each marker appears as a relatively bright spot in the captured images, and the system can determine the spatial coordinates (e.g., Cartesian, spherical, cylindrical, etc.) and an intensity value that represents, for example, the brightness of each corresponding spot. Due to the greater range for incident angles provided by the retro-reflective markers, the marker can remain visible at different poses or positions relative to the optical sources. This data is provided to a computing device (e.g., a processor) of a computing system 810. The computing device is configured to determine where in the region or environment the retro-reflective markers (and corresponding objects they are attached to) are located with respect to the cameras 804a-b.

Generally, the computing device is part of the computer system 810 that is connected to the array of cameras 804a-b via communication links 812 (e.g., wired communication links or wireless communication links). In some examples, the computing device is located within the camera mounting unit 802. The computing system 810 may include one or more of various forms of digital computers, including, e.g., laptops, desktops, workstations, personal digital assistants, servers, blade servers, mainframes, and other appropriate computers. The computing system 810 may include one or more of various forms of mobile devices, including, e.g., personal digital assistants, tablet computing devices, cellular telephones, smartphones, and other similar computing devices. The components shown here, their connections and relationships, and their functions, are meant to be examples only, and are not meant to limit implementations of the techniques described and/or claimed herein.

Given the known locations of the cameras 804a-b included in the array and the locations of the retro-reflective markers (e.g., marker 600 of FIG. 6A or marker 650 of FIG. 6B), the computing device can calculate a position and/or orientation of the object 808. Further, on the basis of the known relationship between the location of each of the retro-reflective markers and the location of tooltip 820 of object 808 in the working volume (e.g., a tool coordinate system), the computing device can calculate the coordinates of the tooltip 820 in space. In those instances in which the tool 808 is handled by a user (e.g., a surgeon 814) and the tooltip 820 is pressed against or is otherwise in contact with a surface (e.g., a body 816 of a patient), the coordinates of the tooltip 820 correspond to the coordinates of the point at which the tooltip 820 contacts the surface.

A number of implementations of the subject matter have been described. Nevertheless, it will be understood that various modifications may be made without departing from the spirit and scope of the subject matter disclosed herein. For example, the position of retro-reflective markers and tracked objects can change with time. The computing device may be configured to automatically detect which bright spots in an image are identified as retro-reflections provided by the retro-reflective markers at a first time and at first positions, and which bright spots in the image are identified as retro-reflections provided by the retro-reflective markers at a second time and at second positions. Accordingly, other implementations are within the scope of the following claims.

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, tracking system 800 and the computing system 810 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on a computer storage medium for execution by, or to control the operation of, data processing apparatus. For example, a computing system (such as computing system 810) can be used in the tracking system to control the operation of the emitter and to process the images captured by the image sensor. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. In some implementations, computing system 810 includes a data processing apparatus as described herein. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize different computing model infrastructures, such as web services, distributed computing, and grid computing infrastructures.

A computer program (also known as a program, software, software application, script, or code) can be written in any form of programming language, including compiled or interpreted languages, and declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 9:
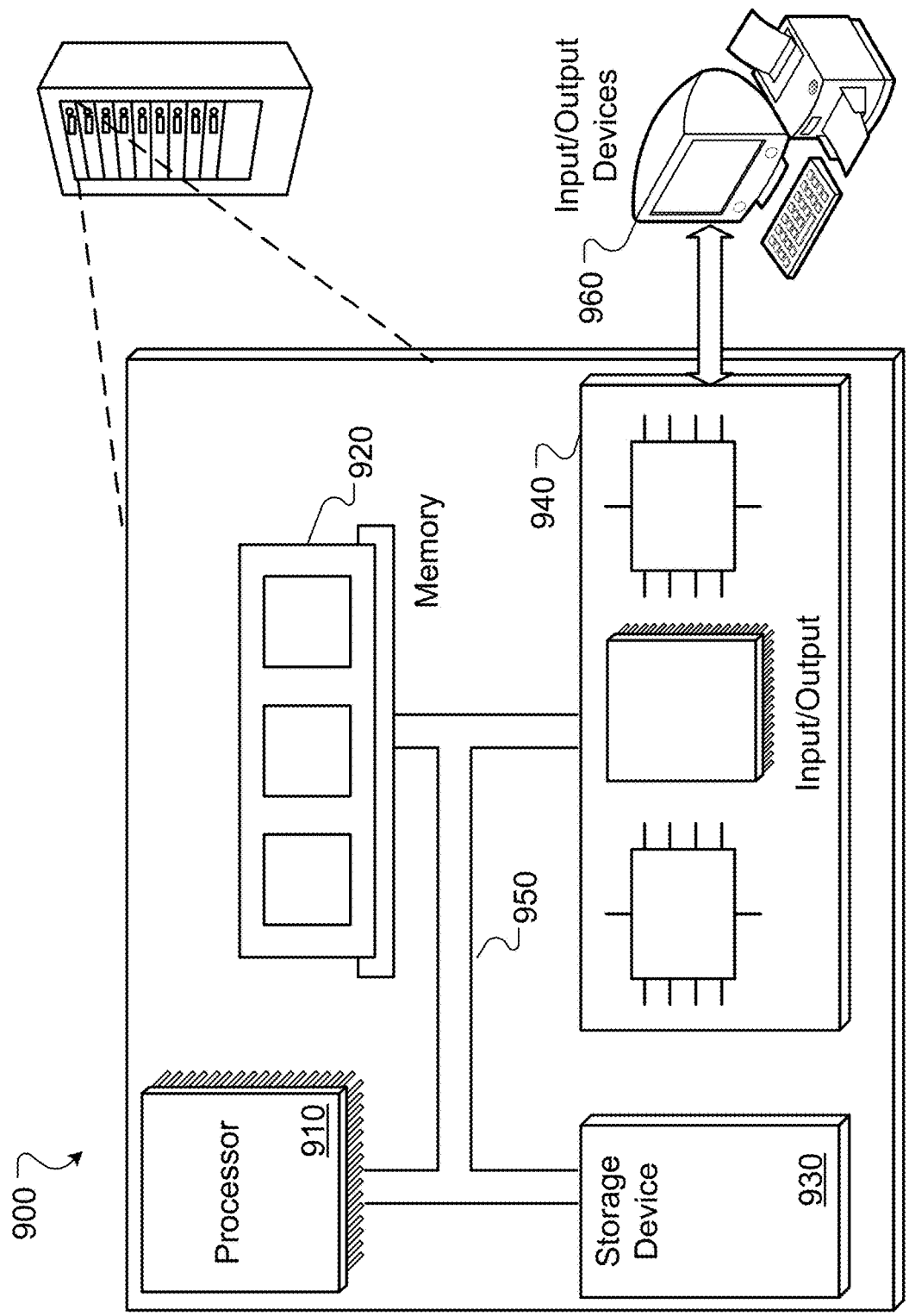
FIG. 9 shows a diagram of an example computing system.

FIG. 9 shows an example computer system 900 (e.g., similar to or including computing system 810 of FIG. 8) that includes a processor 910, a memory 920, a storage device 930 and an input/output device 940. Each of the components 910, 920, 930, and 940 can be interconnected, for example, by a system bus 950. The processor 910 is capable of processing instructions for execution within the system 900. In some implementations, the processor 910 is a single-threaded processor, a multi-threaded processor, or another type of processor. The processor 910 is capable of processing instructions stored in the memory 920 or on the storage device 930. The memory 920 and the storage device 930 can store information within the system 900.

The input/output device 940 provides input/output operations for the system 900. In some implementations, the input/output device 940 can include one or more of a network interface device, e.g., an Ethernet card, a serial communication device, e.g., an RS-232 port, and/or a wireless interface device, e.g., an 802.11 card, a 3G wireless modem, a 4G wireless modem, an 8G wireless modem, etc. In some implementations, the input/output device can include driver devices configured to receive input data and send output data to other input/output devices, e.g., keyboard, printer and display devices 960. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

Thus, specific embodiments of the optical tracking system and retro-reflective markers and methods for using the optical tracking system to track retro-reflective markers have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Where a range of values is provided, it is understood that each intervening value, to the tenth of the unit of the lower limit unless the context clearly dictates otherwise, between the upper and lower limit of that range and any other stated or intervening value in that stated range is encompassed within the subject matter disclosed herein. That the upper and lower limits of these smaller ranges may independently be included in the smaller ranges is also encompassed within the subject matter disclosed herein, subject to any specifically excluded limit in the stated range. Where the stated range includes one or both of the limits, ranges excluding either or both of those included limits are also included in the subject matter disclosed herein.

Unless defined otherwise, all technical and scientific terms used herein have the same meaning as commonly understood by one of ordinary skills in the art to which this subject matter belongs. Although any methods and materials similar or equivalent to those described herein can also be used in the practice or testing of the present subject matter, a limited number of the exemplary methods and materials are described herein.

What is claimed is:

1. An apparatus comprising:
   a retro-reflective section in a curved shape, the retro-reflective section comprising:
   an outer surface,
   an inner surface, and
   a plurality of retro-reflective microelements comprising a plurality of reflective surfaces, wherein each of the plurality of retro-reflective microelements extends from the inner surface at a location different from locations of the other retro-reflective microelements, and each of the plurality of retro-reflective microelements comprises a central axis extending along a direction that corresponds to a surface normal of the outer surface,
   wherein each of the plurality of retro-reflective microelements comprises two or more planar angles that are perturbed away from a reference angle by a respective value of a predetermined range.
2. The apparatus of claim 1, wherein one or more of the plurality of reflective surfaces are formed by depositing a reflective coating on surfaces of the plurality of retro-reflective microelements.

3. The apparatus of claim 2, wherein the reflective coating is deposited on the one or more of the plurality of the reflective surfaces of the plurality of retro-reflective microelements through vapor deposition.

4. The apparatus of claim 2, wherein the reflective coating includes a metal material.

5. The apparatus of claim 1, wherein one or more of the plurality of reflective surfaces are formed without a reflective coating deposited on surfaces of the plurality of retro-reflective microelements.

6. The apparatus of claim 1, wherein one of the plurality of retro-reflective microelements is a microprism.

7. The apparatus of claim 1, wherein the retro-reflective section further comprises a coupling mechanism to couple the retro-reflective section with one or more other retro-reflective sections.

8. The apparatus of claim 1, wherein the retro-reflective section forms at least a portion of a retro-reflective marker having a hollow spherical shape.

9. The apparatus of claim 1, wherein the retro-reflective section forms at least a portion of a retro-reflective marker having a hollow cylindrical shape.

10. The apparatus of claim 1, wherein the retro-reflective section forms at least a portion of a retro-reflective marker having a hollow conical shape.

11. The apparatus of claim 1, wherein the retro-reflective section forms a retro-reflective marker.

12. The apparatus of claim 1, wherein a geometry and an arrangement of the plurality of retro-reflective microelements are pre-determined for manufacturing the retro-reflective section, wherein the retro-reflective section is manufactured by injection molding.

13. The apparatus of claim 1, wherein each edge of one of the plurality of retro-reflective microelements has a length of less than 1 mm.

14. The apparatus of claim 1, wherein each of the plurality of retro-reflective microelements defines a microprism center, and two adjacent retro-reflective microelements of the plurality of retro-reflective microelements are spaced apart between respective microprism centers at a distance of less than 1 mm.

15. The apparatus of claim 1, wherein the central axis extends in a direction that is offset from the surface normal of the outer surface.

16. The apparatus of claim 15, wherein the offset is determined by applying a randomization algorithm to the plurality of retro-reflective microelements.

17. The apparatus of claim 1, wherein the retro-reflective section includes a polymer that is transmissive in the Near Infrared (NIR) spectrum band.

18. The apparatus of claim 1, wherein the retro-reflective section forms a portion of a body of a tool for optical tracking.

19. The apparatus of claim 1, wherein the retro-reflective section forms a portion of a marker configured to be mounted to a tool for optical tracking.

20. The apparatus of claim 1, wherein the retro-reflective section comprises a first retro-reflective section and a second retro-reflective section, wherein the first retro-reflective section forms a portion of a body of a tool for optical tracking, and the second retro-reflective section forms a portion of a marker configured to be mounted to the tool.

21. A marker comprising:
a first portion comprising one or more retro-reflective sections coupled to one another, wherein one of the one or more retro-reflective sections is in a curved shape, the one of the one or more retro-reflective sections comprising:
an outer surface,
an inner surface, and
a plurality of retro-reflective microelements comprising a plurality of reflective surfaces, wherein each of the plurality of retro-reflective microelements extends from the inner surface at a location different from locations of the other retro-reflective microelements, and each of the plurality of retro-reflective microelements comprises a central axis extending along a direction that corresponds to a surface normal of the outer surface,
wherein each of the plurality of retro-reflective microelements comprises two or more planar angles that are perturbed away from a reference angle by a respective value of a predetermined range; and
a second portion comprising a connecting mechanism configured to connect the first portion to a device.

22. The marker of claim 21, wherein one or more of the plurality of reflective surfaces are formed by depositing a reflective coating on surfaces of the plurality of retro-reflective microelements.

23. The marker of claim 22, wherein the reflective coating is deposited on the one or more of the plurality of the reflective surfaces of the plurality of retro-reflective microelements through vapor deposition.

24. The marker of claim 21, wherein the marker has a hollow spherical shape, a hollow cylindrical shape, or a hollow conical shape.

25. The marker of claim 21, wherein one of the plurality of retro-reflective microelements is a microprism, and each edge of the microprism has a length of less than 1 mm.

26. An apparatus comprising:
a device for optical tracking, and
a retro-reflective marker attached to the device through a connecting mechanism of the retro-reflective marker, wherein the retro-reflective marker comprises one or more retro-reflective sections coupled to one another, wherein one of the one or more retro-reflective sections is in a curved shape, the one of the one or more retro-reflective sections comprising:
an outer surface,
an inner surface, and
a plurality of retro-reflective microelements comprising a plurality of reflective surfaces, wherein each of the plurality of retro-reflective microelements extends from the inner surface at a location different from locations of the other retro-reflective microelements, and each of the plurality of retro-reflective microelements comprises a central axis extending along a direction that corresponds to a surface normal of the outer surface,
wherein each of the plurality of retro-reflective microelements comprises two or more planar angles that are perturbed away from a reference angle by a respective value of a predetermined range.

27. The apparatus of claim 26, wherein one or more of the plurality of reflective surfaces are formed by depositing a reflective coating on surfaces of the plurality of retro-reflective microelements.

28. The apparatus of claim 27, wherein the reflective coating is deposited on the one or more of the plurality of the reflective surfaces of the plurality of retro-reflective microelements through vapor deposition.

29. The apparatus of claim 26, wherein the retro-reflective marker has a hollow spherical shape, a hollow cylindrical shape, or a hollow conical shape.

30. The apparatus of claim 26, wherein one of the plurality of retro-reflective microelements is a microprism, and each edge of the microprism has a length of less than 1 mm.

\* \* \* \* \*